(12) United States Patent
Seomoon

(10) Patent No.: US 7,272,841 B2
(45) Date of Patent: Sep. 18, 2007

(54) DISK FOR DISK DRIVE HAVING CRACK BLOCKING PORTIONS

(75) Inventor: Kie-Tae Seomoon, Suwon (KR)

(73) Assignee: Hitachi-LG Data Storage Korea Inc., Seoul (KR)

( * ) Notice: Subject to any disclaimer, the term of this patent is extended or adjusted under 35 U.S.C. 154(b) by 367 days.

(21) Appl. No.: 10/967,147

(22) Filed: Oct. 19, 2004

(65) Prior Publication Data

US 2005/0108744 A1    May 19, 2005

(30) Foreign Application Priority Data

Oct. 28, 2003  (KR) .................. 10-2003-0075642

(51) Int. Cl.
*G11B 7/24* (2006.01)
(52) U.S. Cl. .................................... 720/722
(58) Field of Classification Search ............. 720/722, 720/721, 718; 369/282
See application file for complete search history.

(56) References Cited

U.S. PATENT DOCUMENTS 6,532,210 B2 *  3/2003  Park ........................ 369/282
7,096,480 B2 *  8/2006  Chuang .................... 720/721

FOREIGN PATENT DOCUMENTS

KR       2001-0054816 A     7/2001

* cited by examiner

*Primary Examiner*—Angel Castro
(74) *Attorney, Agent, or Firm*—Birch, Stewart, Kolasch & Birch, LLP

(57) ABSTRACT

A disk for a disk drive including a disk body with a center through hole for fixing the disk body to a turntable formed at a center thereof, a clamping portion formed on the disk body around the center through hole to fix the disk body to the turntable, a signal recording portion which is formed on a surface of the disk body around a rim of the clamping potion and includes a signal recording section on which digital signals are recorded, and crack blocking portions bored through the clamping portion.

10 Claims, 5 Drawing Sheets

DISK FOR DISK DRIVE HAVING CRACK BLOCKING PORTIONS

This Non-provisional application claims priority under 35 U.S.C. § 119(a) on Patent Application No(s). 10-2003-0075642 filed in Korea, Republic of on Oct. 28, 2003, the entire contents of which are hereby incorporated by reference.

BACKGROUND OF THE INVENTION

1. Field of Invention

The present invention relates to a disk for a disk drive, and more particularly, to a disk, at least one surface of which is provided with a signal recording portion to record and reproduce signals in a disk drive.

2. Description of the Prior Art

Disks (for example, CDs or DVDs) are used as media for recording and reproducing digital data. The recording and reproduction of the digital data in the disk is performed in a disk drive. FIG. 1 shows a plan view of the disk according to a prior art.

As shown in the figure, a disk 10 comprises a disk body 12 shaped in a circular disk. The center of the circular disk body 12 is formed with a center through hole 14. The center through hole 14 with a predetermined diameter is bored through the center of the disk body 12.

The center through hole 14 is fitted onto an insertion cone provided on a turntable of the disk drive. That is, an inner peripheral surface of the center through hole 14 is fitted onto an outer peripheral surface of the insertion cone.

A clamping portion 16 with a predetermined width is formed around the center through hole 14. A lower surface of the clamping portion 16 is seated onto the turntable. A clamp for fixing the disk 10 to the turntable is seated onto an upper surface of the clamping portion 16. In a case where in the disk drive, the insertion cone is provided with the clamp, the upper surface of the clamping portion 16 is not naturally used for the disk to be clamped.

A signal recording portion 18 ranges from an outside of the clamping portion 16 to a rim of the disk body 12. The signal recording portion 18 is provided with a signal recording section 19, inner and outer rims of which are formed with inner and outer rim sections 20 and 20', respectively. The inner rim section 20 is a boundary between the clamping portion 16 and the signal recording section 19.

However, the above prior art has the following problems.

That is, as shown in FIG. 2, in the conventional disk 10, cracks c occur on an outer rim of the center through hole 14. This is the reason why a force may be applied thereto while a friction is generated between the outer rim of the center through hole 14 and the insertion cone in a process of seating and separating the disk 10 onto and from the turntable. Particularly, in a case where the insertion cone has the structure for clamping the disk 10, the cracks c easily occur.

In addition, as the speed of the disk drive has been recently increased at a high multiple access speed, the rotation rate of the disk 10 generally increases to 8,000 rpm or more. However, if the rotation rate of the disk 10 increases, causing a centrifugal force to increase, the cracks occurring on the outer rim of the center through hole 14 gradually propagate up to the signal recording portion 18. In a severe case, it may be possible not to use the disk since the disk body 12 is completely broken. Furthermore, some broken pieces of the broken disk body 12 spatter outward, so that users may be injured.

SUMMARY OF THE INVENTION

Accordingly, the present invention is conceived to solve the aforementioned problems in the prior art. An object of the present invention is to provide a disk for a disk drive wherein cracks occurring on the disk cannot be prevented from propagating beyond a predetermined range.

According to an aspect of the present invention for achieving the objects, there is provided a disk for a disk drive, comprising a disk body with a center through hole for fixing the disk body to a turntable formed at a center thereof; a clamping portion formed on the disk body around the center through hole to fix the disk body to the turntable; a signal recording portion formed on a surface of the disk body around a rim of the clamping portion and including a signal recording section in which digital signals are recorded; and crack blocking portions bored through the clamping portion.

Preferably, the crack blocking portions comprises circular through holes.

More preferably, the crack blocking portions comprises slot shaped through holes with a predetermined curvature.

An outer side section of a contour of each of the slot shaped through holes is formed in a curved line and is longer than an corresponding inner side section thereof.

The contour of each of the slot shaped through holes is formed in curved lines.

The crack blocking portions are arranged in circles, and the crack blocking portions arranged in a relatively inner circle and the crack blocking portions arranged in a relatively outer circle are arranged in a zigzag pattern.

A coating layer is formed on surfaces of the clamping portion in which the crack blocking portions are formed, or heat treatment is performed thereon.

According to the disk for the disk drive of the present invention so constructed, there is an advantage in that cracks occurring on an outer rim of the center through hole do not propagate up to the signal recording portion.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE PREFERRED EMBODIMENT

Hereinafter, preferred embodiments of a disk for a disk drive according to the present invention will be described in detail with reference to the accompanying drawings.

Figure 1:
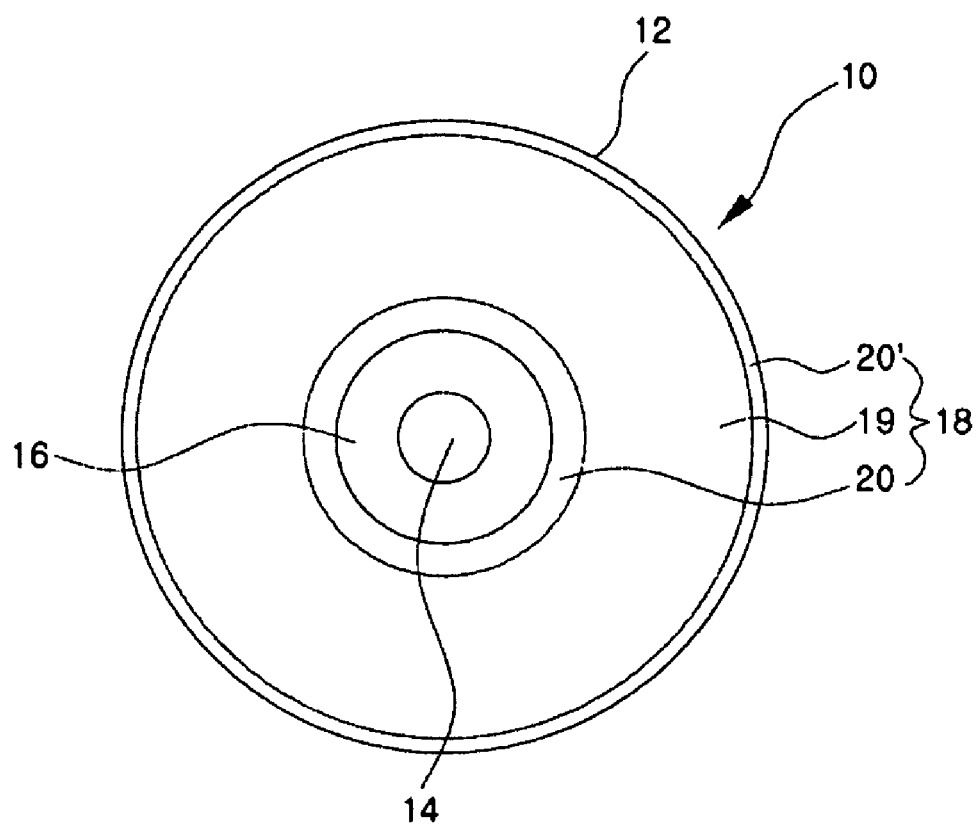
FIG. 1 is a plan view showing a disk for a disk drive according to a prior art.
Figure 2:
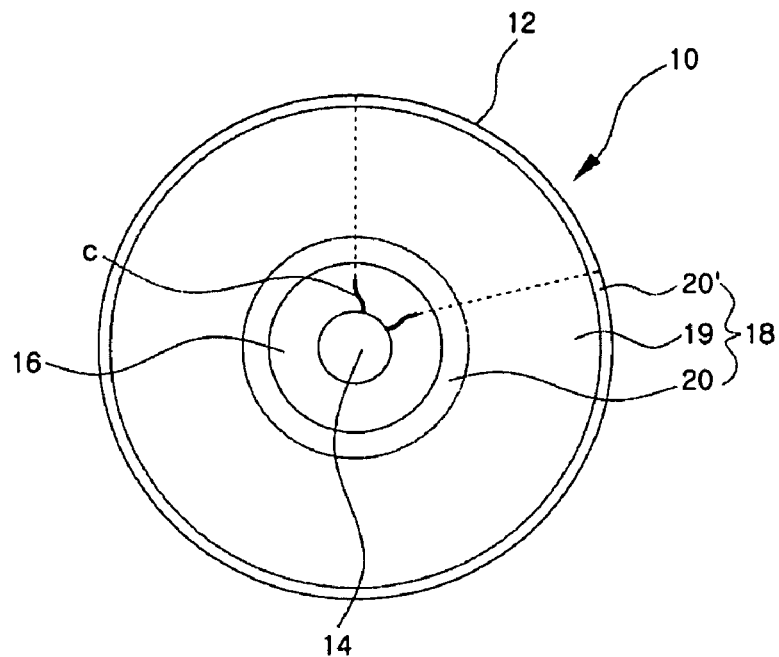
FIG. 2 is a view illustrating a problem of the disk according to the prior art.
Figure 3:
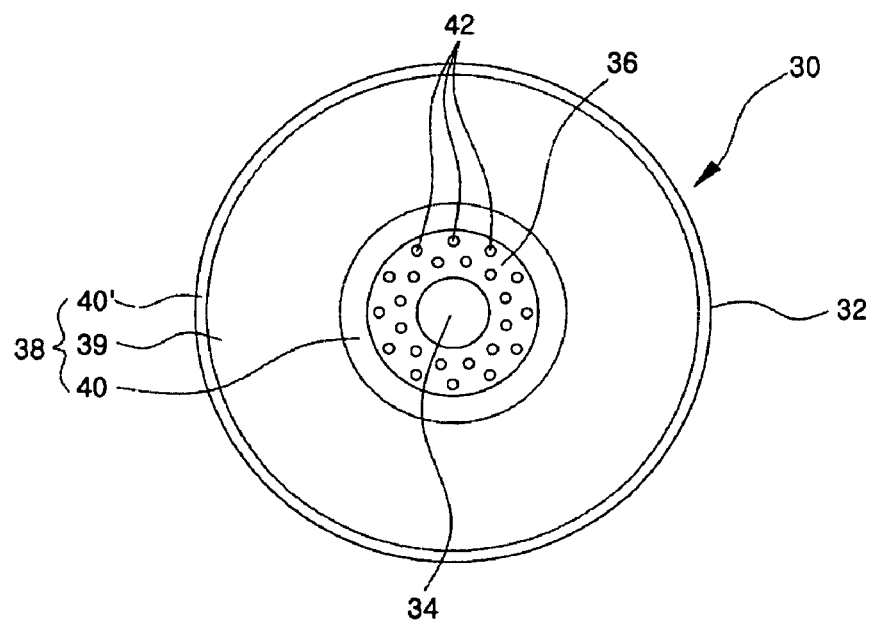
FIG. 3 is a plan view showing a preferred embodiment of a disk for a disk drive according to the present invention.

FIG. 3 is a plan view showing a preferred embodiment of a disk for a disk drive according to the present invention.

As shown in the figure, a disk 30 of the embodiment of the present invention consists of a disk body 32 shaped in a circular disk. The center of the disk body 32 is formed with a center through hole 34 concentrically with the disk body 32. An insertion cone provided in a turntable of the disk drive is seated into the center through hole 34 when seating the disk 30 on the turntable. An outer diameter of the insertion cone is formed to be the same as or slightly smaller than an inner diameter of the center through hole 34.

A clamping portion 36 is formed to extend over a predetermined width from the center through hole 34 toward a circumference of the disk body 32. The clamping portion 36 is a portion which is seated on the turntable. Particularly, a surface of the clamping portion 36 corresponding to a lower surface of the disk body 32 is seated on the turntable.

In addition, according to the kind of the disk drive, a clamp is seated on the opposite surface of the clamping portion 36 corresponding to an upper surface of the disk body 32. In a general slim disk drive, the insertion cone is provided with a structure for clamping the disk, so that an outer rim of the center through hole 34 is used for clamping the disk.

A signal recording portion 38 ranges from an outside of the clamping portion 36 to a rim of the disk body 32. The signal recording portion 38 is provided with a signal recording section 39 with a predetermined width in which digital data are recorded. Inner and outer rims of the signal recording section 39 are formed with inner and outer rim sections 40 and 40' with predetermined widths, respectively. The inner rim section 40 is a boundary between the signal recording section 39 and the clamping portion 36.

In the meantime, the clamping portion 36 is formed with crack blocking portions 42. In the present embodiment, each crack blocking portion 42 is shaped in a circular through hole. A plurality of the crack blocking portions 42 are bored through the clamping portion 36. The plurality of the crack blocking portions 42 are arranged in circles.

In the present embodiment, the crack blocking portions 42 are arranged to substantially form two circles. At this time, any one of the crack blocking portions 42 arranged in the relatively inner circle and any one of the crack blocking portions 42 arranged in the relatively outer circle are not formed on the same radial line of the disk body.

That is, the crack blocking portions 42 arranged in the relatively inner circle and the crack blocking portions 42 arranged in the relatively outer circle are formed in a zigzag pattern, i.e. in a staggered fashion. It is intended for the crack blocking portions 42 arranged in the relatively outer circle to block cracks c although the cracks c propagate through between the crack blocking portions 42 arranged in the relatively inner circle. In practice, it is preferred that the number of the circles formed by the crack blocking portions 42 be large in the case where each crack blocking portion 42 is formed in the circular through hole.

Figure 4:
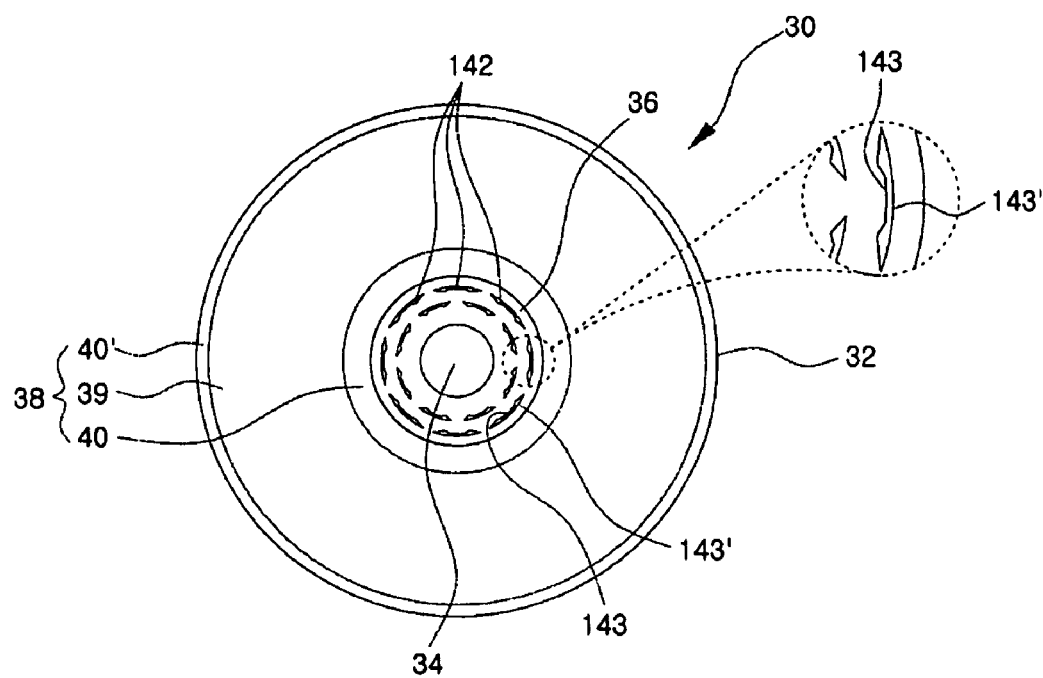
FIG. 4 is a plan view showing another embodiment of the present invention.

In the meantime, FIG. 4 shows another embodiment of the present invention, wherein for convenience of description, only different portions from the previous embodiment will be described and reference numerals increased by one hundred are given to the same elements as the previous embodiment.

In the present embodiment, crack blocking portions 142 each of which is shaped in a slot with a predetermined curvature is bored through a clamping portion 136. That is, each crack blocking portion 142 is formed so that a difference between radii of its inside and outside curved sections 143 and 143' from the center of a disk body 132 is the same as a width of the slot, i.e. the crack blocking portion 142.

Alternatively, the inside and outside curved sections 143 and 143' may be formed to differ from each other in center of curvature.

A plurality of the crack blocking portions 142 are also arranged in circles, wherein the number of the circles formed by the crack blocking portions 142 is two in the present embodiment. In addition, the crack blocking portions 142 in the relatively inner circle and the crack blocking portions 142 arranged in the relatively outer circle are formed in a zigzag pattern. Therefore, it is possible for the crack blocking portions 142 in the relatively outer circle to block the cracks c although the cracks c propagate after passing between the crack blocking portions 142 arranged in the relatively inner circle.

Figure 5:
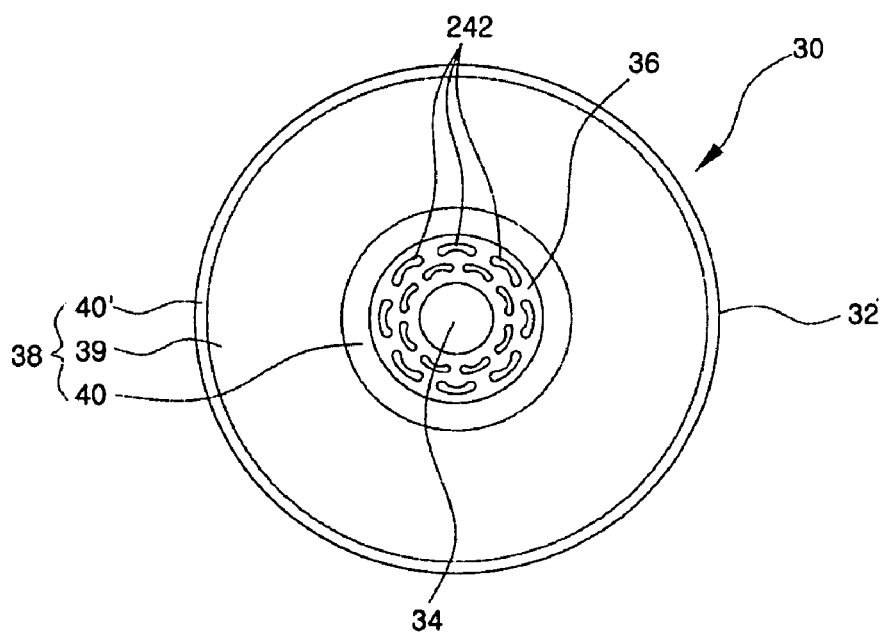
FIG. 5 is a plan view showing an additional embodiment of the present invention.

Next, FIG. 5 shows an additional embodiment of the present invention. In the present embodiment, crack blocking portions 242, each of which is shaped in a slot with a predetermined curvature, are bored through a clamping portion 236. In the present embodiment, a contour of each crack blocking portion 242 consists of curved lines as shown in FIG. 5.

In addition, even in the present embodiment, a plurality of the crack blocking portions 242 are arranged in the clamping portion 236 in two circles, which are formed relatively inside and outside, respectively. Furthermore, the crack blocking portions 242 arranged in the relatively inner circle and the crack blocking portions 242 arranged in the relatively outer circle are also arranged in a zigzag pattern.

In the meantime, in the embodiments described above, coating layers may be separately formed on surfaces of the clamping portions 36, 136, and 236 in which the crack blocking portions 42, 142, and 242 are formed, or heat treatment may be performed thereon. By forming the coating layers or performing the heat treatment on the clamping portions 36, 136, and 236, it is possible to reinforce strength, which may decrease since the crack blocking portions 42, 142, and 242 are formed.

Hereinafter, an operation of the disk for the disk drive according to the present invention so constructed will be described.

In the present invention, by forming the crack blocking portions 42, 142, and 242 in the clamping portions 36, 136, and 236, which correspond to peripheral portions of the center through holes 34, 134, and 234 of the disks 30, 130, and 230, the cracks c occurring on the rims of the center through holes 34, 134, and 234 are prevented from propagating up to the signal recording portions 38, 138, and 238.

Figure 6A:
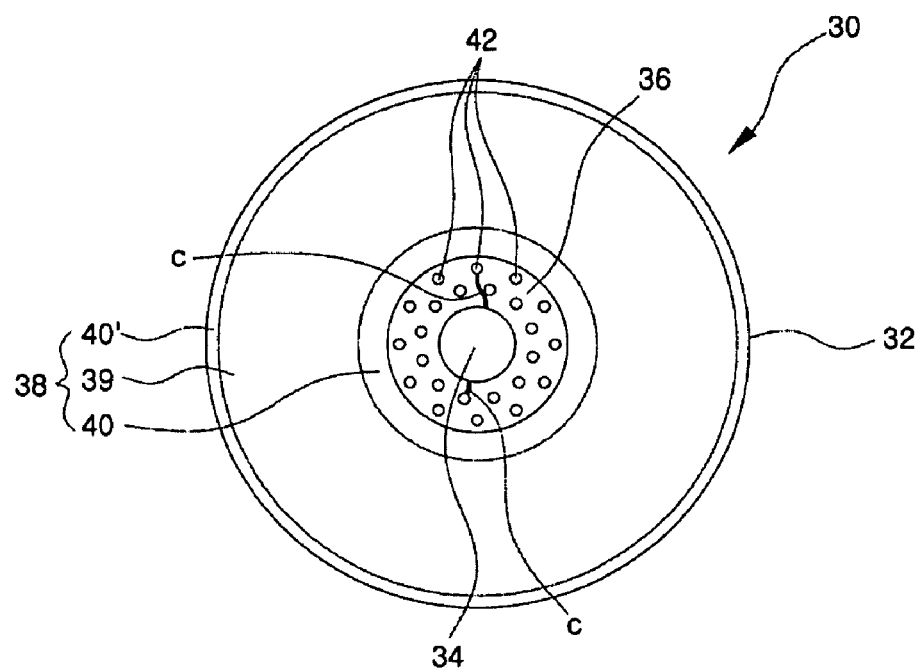
FIGS. 6a to 6c are views showing that the embodiments of the present invention prevent cracks from further propagating.
Figure 6B:
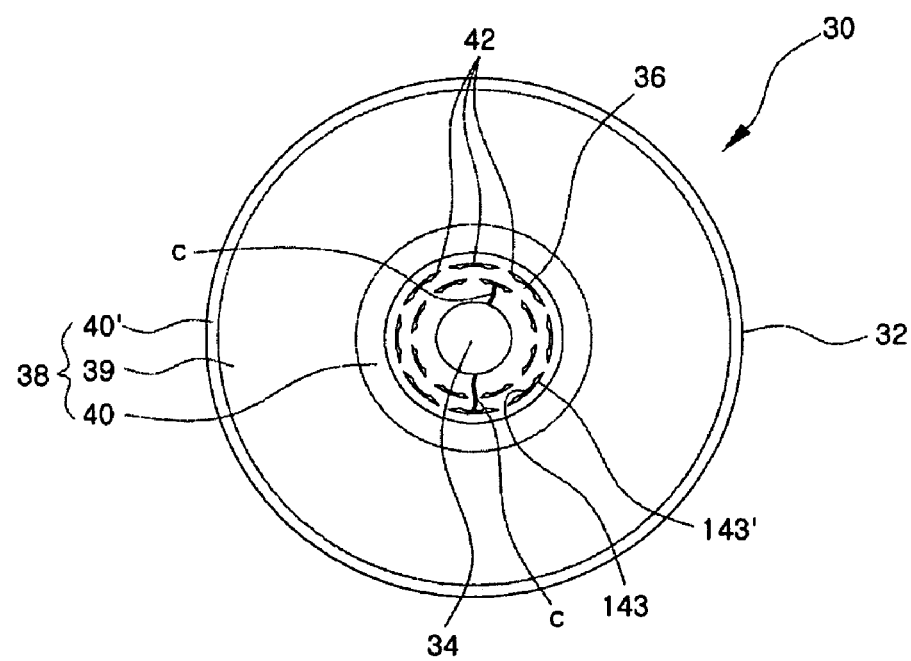
Figure 6C:
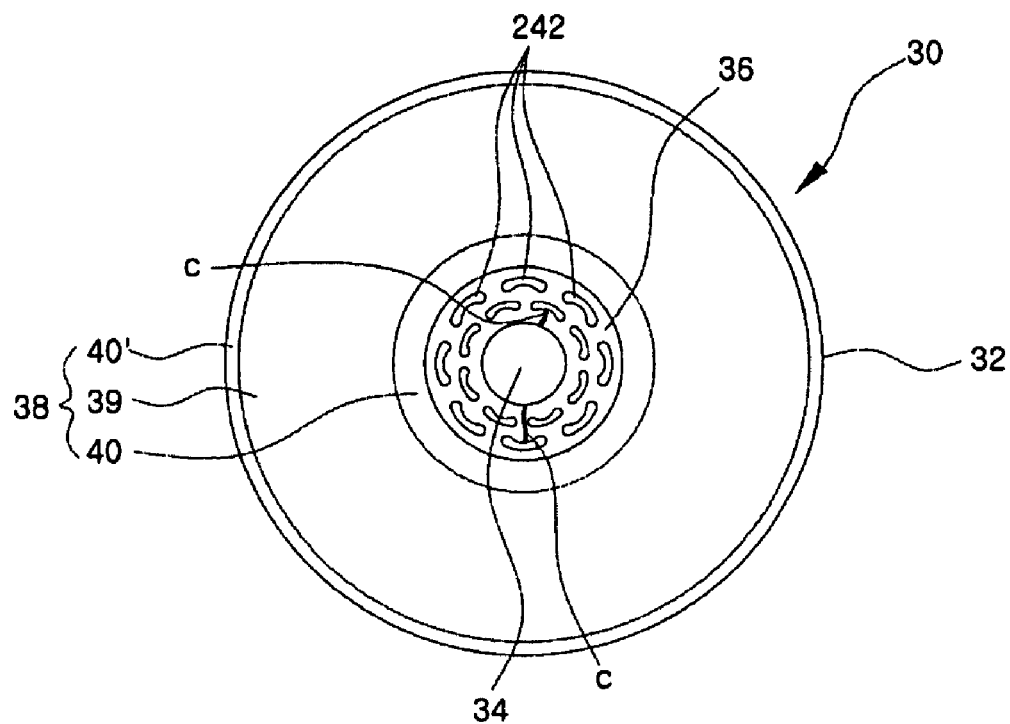

That is, as shown in FIGS. 6a to 6c, when the cracks c occurring on the rims of the center through holes 34, 134, and 234 further propagate by the centrifugal forces caused from the rotations of the disks 30, 130, and 230 or external forces applied to the disks 30, 130, and 230, the cracks c propagate no more if they meet the crack blocking portions 42, 142, and 242.

The phenomenon that the cracks c stop propagating when meeting the crack blocking portions 42, 142, and 242 is due to stress concentration. That is, once the cracks c occur, the cracks c further propagate while stresses are concentrated at distal ends of the cracks c. However, if the cracks c meet the crack blocking portions 42, 142, and 242, the stresses are dispersed around the rims of the crack blocking portions 42, 142, and 242, and thus, the cracks c are prevented from further propagating.

Particularly, if angled portions are not formed in edges of the crack blocking portions 42, 142, and 242 and the edges are generally shaped in curved lines, the above effect more increases. In the embodiment shown in FIG. 4, although both ends of each crack blocking portion 142 are formed with angled portions, since the outside curved section 143' of the crack blocking portion 142 is relatively long, the cracks c cannot propagate toward the signal recording portion 39 once meeting the crack blocking portion 142.

In the meantime, even if the cracks c pass between the crack blocking portions 42, 142, and 242 arranged in the relatively inner circles, the cracks c propagate no more by means of the crack blocking portions 42, 142, and 242 arranged in the relatively outer circles.

As described above in detail, the disk for the disk drive according to the present invention is configured so that the clamping portion of the disk body is formed with the crack blocking portions.

Therefore, even if the cracks occur on the rim of the center through hole of the disk body, by means of the crack blocking portions, the cracks are blocked from propagating, so that the signal recording portion or disk body can be prevented from damaging or breaking.

Particularly, even if the rotation rate of the disk and therefore the centrifugal force increase in a high multi-speed disk drive, an advantage of preventing the cracks occurring from further propagating can be expected.

In addition, by forming the coating layers or performing the heat treatment on the clamping portion, it is possible to reinforce the strength, which may relatively decrease.

The scope of the present invention is not limited to the embodiments described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

For example, the shape of the crack blocking portion may be variously modified in addition to those described in the present embodiments.

What is claimed is:

1. A disk for a disk drive, comprising:
    a disk body with a center through hole for fixing the disk body to a turntable formed at a center thereof;
    a clamping portion formed on the disk body around the center through hole to fix the disk body to the turntable;
    a signal recording portion formed on a surface of the disk body around a rim of the clamping portion and including a signal recording section in which digital signals are recorded; and
    crack blocking portions bored through the clamping portion,
    wherein the crack blocking portions comprise slot shaped rounded through holes with a predetermined curvature.

2. The disk as claimed in claim 1, wherein an outer side section of a contour of each of the slot shaped through holes is formed in a curved line and is longer than an corresponding inner side section thereof.

3. The disk as claimed in claim 1, wherein the contour of each of the slot shaped through holes is formed in curved lines.

4. The disk as claimed in claim 1, wherein the crack blocking portions are arranged in circles, and the crack blocking portions arranged in a relatively inner circle and the crack blocking portions arranged in a relatively outer circle are arranged in a zigzag pattern.

5. The disk as claimed in claim 1, wherein a center portion of the slot shaped through holes is thinner than other portions of the slot shaped through holes.

6. A disk for a disk drive, comprising:
    a disk body with a center through hole for fixing the disk body to a turntable formed at a center thereof;
    a clamping portion formed on the disk body around the center through hole to fix the disk body to the turntable;
    a signal recording portion formed on a surface of the disk body around a rim of the clamping portion and including a signal recording section in which digital signals are recorded;
    crack blocking portions bored through the clamping portion; and
    a coating layer or heat-treated layer on surfaces of the clamping portion in which the crack blocking portions are formed.

7. A disk for a disk drive, comprising:
    a disk body with a center through hole for fixing the disk body to a turntable formed at a center thereof;
    a clamping portion formed on the disk body around the center through hole to fix the disk body to the turntable;
    a signal recording portion formed on a surface of the disk body around a rim of the clamping portion and including a signal recording section in which digital signals are recorded; and
    crack blocking portions bored through the clamping portion,
    wherein the crack blocking portions comprise slot shaped through holes with a center portion being thinner than portions adjacent to the center portion.

8. The disk as claimed in claim 7, wherein an outside section of the slot shaped through holes is a smooth curved section and an inside section of the slot shaped through holes comprises a wing shape such that the center portion is thinner than the portions adjacent to the center portion.

9. The disk as claimed in claim 7, wherein the crack blocking portions are arranged in circles, and wherein the crack blocking portions arranged in a relatively inner circle and the crack blocking portions arranged in a relatively outer circle are arranged in a zigzag pattern.

10. The disk as claimed in claim 7, further comprising:
    a coating layer or heat-treated layer on surfaces of the clamping portion in which the crack blocking portions are formed.

* * * * *